United States Patent [19]

Li et al.

[11] Patent Number: 5,130,345
[45] Date of Patent: Jul. 14, 1992

[54] METHOD OF PREPARING FOAM USING A PARTIALLY FLUORINATED ALKANE HAVING A TERTIARY STRUCTURE AS A BLOWING AGENT

[75] Inventors: Chien C. Li, East Aurora, N.Y.; Bernard Sukornick, Cooper City, Fla.

[73] Assignee: Allied-Signal Inc., Morris Township, Morris County, N.J.

[21] Appl. No.: 546,173

[22] Filed: Jun. 29, 1990

[51] Int. Cl.$^5$ ............... C08J 9/14; C08G 18/00; C08G 18/06
[52] U.S. Cl. ...................... 521/131; 521/98; 521/155; 521/163; 521/170
[58] Field of Search ............ 521/131, 98, 155, 163, 521/170

[56] References Cited

U.S. PATENT DOCUMENTS

| | | | |
|---|---|---|---|
| 3,183,192 | 5/1965 | Bauer | 521/131 |
| 4,076,644 | 2/1978 | Burnt et al. | 521/131 |
| 4,177,332 | 12/1979 | Mitschke et al. | 521/131 |
| 4,417,001 | 11/1983 | Suoboda et al. | 521/131 |
| 4,529,744 | 7/1985 | Wood | 521/131 |
| 4,624,970 | 11/1986 | Dwyer et al. | 521/131 |

OTHER PUBLICATIONS

"The Perfluoro-t≠butyl Anion in the Synthesis of Organofluorine Compounds"—Dyatkin et al.
"How to Fix the CFC Mix", Chemicalweek/Oct. 18, 1989.

Primary Examiner—John Kight, III
Assistant Examiner—John M. Cooney, Jr.
Attorney, Agent, or Firm—Melanie L. Brown; Jay P. Friedenson

[57] ABSTRACT

A method for preparing polyurethane and polyisocyanurate foams which comprises reacting and foaming a mixture of ingredients which will react to form the polyurethane or polyisocyanurate foams in the presence of a blowing agent comprising a partially fluorinated alkane having four or five carbon atoms and a tertiary structure. The method is advantageous because partially fluorinated alkanes having a tertiary structure have zero ozone depletion potentials, are nonflammable, and have higher solvency toward polyols.

10 Claims, No Drawings

METHOD OF PREPARING FOAM USING A PARTIALLY FLUORINATED ALKANE HAVING A TERTIARY STRUCTURE AS A BLOWING AGENT

FIELD OF THE INVENTION

This invention relates to a method of preparing foam using a partially fluorinated alkane having four or five carbon atoms and a tertiary structure as the blowing agent.

CROSS-REFERENCE TO RELATED APPLICATION

Commonly assigned, U.S. Pat. No. 5,059,728 claims partially fluorinated alkanes having a tertiary structure and 4 to 9 carbon atoms.

BACKGROUND OF THE INVENTION

The art is continually seeking new fluorocarbons which are useful as blowing agents. Fluorocarbons such as trichlorofluoromethane (known in the art as CFC-11 and which has a boiling point of 23.7° C.) have been used commercially as auxiliary blowing agents for flexible foams and as primary blowing agents for rigid foams. Polyurethane foams are manufactured by reacting and foaming a mixture of ingredients comprising in general an organic isocyanate, such as pure or crude toluene diisocyanate or a polymeric diisocyanate, with an appropriate amount of polyol or mixture of polyols, in the presence of a volatile liquid blowing agent, which vaporizes during the reaction, causing the polymerizing mixture to foam. The reactivity of these ingredients is enhanced through the use of various additives such as amine and/or tin catalysts and surfactant materials which serve to control and adjust cell size as well as to stabilize the foam structure during its formation.

Flexible polyurethane foams are generally manufactured using an excess of diisocyanate which reacts with the water also included as a raw material, producing gaseous carbon dioxide, causing foam expansion. Flexible foams are widely used as cushioning materials in items such as furniture, bedding and automobiles. Auxiliary physical blowing agents such as methylene chloride and/or CFC-11 are required in addition to the water/diisocyanate blowing mechanism in order to produce low density, soft grades of flexible polyurethane foam.

Rigid polyurethane foams are almost exclusively expanded using CFC-11 as the blowing agent. Some rigid foam formulations do incorporate small amounts of water in addition to the CFC-11, but the CFC-11 is the major blowing agent component. Other formulations sometimes use small amounts of the more volatile dichlorodifluoromethane (known in the art as CFC-12 and which has a boiling point of −29.8° C.) in addition to CFC-11 for producing so-called froth-type foams. Rigid foams are closed-cell foams in which the CFC-11 vapor is trapped in the matrix of cells. These foams offer excellent thermal insulation characteristics, due in part to the low vapor thermal conductivity of CFC-11, and are used widely in thermal insulation applications such as roofing systems, building panels, refrigerators and freezers and the like.

Currently, fluorocarbons are of particular interest because they are considered to be stratospherically safe substitutes for the presently used fully halogenated chlorofluorocarbons. The latter are suspected of causing environmental problems in connection with the earth's protective ozone layer. CFC-11 and CFC-12 are controlled substances under the Montreal Protocol on Substances that Deplete the Ozone Layer. Mathematical models have substantiated that hydrochlorofluorocarbons are negligible contributors to ozone depletion and to green-house global warming in comparison to the fully halogenated species.

As discussed in "How to Fix the CFC Mix", CHEMICAL WEEK 64 (Oct. 18, 1989), alternative blowing agents for currently used CFC blowing agents include chlorodifluoromethane (known in the art as HCFC-22 and which has a boiling point of −40.8° C.), 1,1-dichloro-2,2,2-trifluoroethane (known in the art as HCFC-123 and which has a boiling point of 27.8° C.), 1-chloro-1,2,2,2-tetrafluoroethane (known in the art as HCFC-124 and which has a boiling point of −12° C.), 1,1-dichloro-1-fluoroethane (known in the art as HCFC-141b and which has a boiling point of 32° C.), and 1-chloro-1,1-difluoroethane (known in the art as HCFC-142b and which has a boiling point of −9.2° C.).

The use of HCFC-123 as a blowing agent is disadvantageous because HCFC-123 has a high molecular weight; as a result, HCFC-123 is an inefficient blowing agent. The use of HCFC-141b or HCFC-142b as a blowing agent is disadvantageous because the vapors of HCFC-141b and HCFC-142b are flammable; as a result, the shipping, handling, and use of HCFC-141b and HCFC-142b have to be carefully controlled due to the potential flammability. The use of HCFC-22 and HCFC-124 as blowing agents is disadvantageous because they have such low boiling points.

U.S. Pat. No. 4,624,970 discloses the use of mixtures of CFC-11 and dichlorotrifluoroethane to blow urethane type foams. Such blowing agent mixtures were found to permit greater amounts of low cost aromatic polyester polyols to be used in rigid foam formulations without serious degradation in foam properties.

Although hydrochlorofluorocarbon blowing agents have low ozone depletion potentials compared with the fully halogenated chlorofluorocarbons, a need exists in the art for a method of preparing foam with a blowing agent which has a zero ozone depletion potential and is nonflammable.

It is an object of this invention to provide a method for the preparation of polyurethane and polyisocyanurate foams.

A further object of the invention is to provide environmentally acceptable blowing agents for the production of rigid and flexible polyurethane and polyisocyanurate foams.

SUMMARY OF THE INVENTION

The present invention fills the need in the art by providing a method of forming polyurethane and polyisocyanurate foams by reacting and foaming a mixture of ingredients which will react to form polyurethane and polyisocyanurate foams in the presence of a blowing agent comprising a partially fluorinated alkane having four or five carbon atoms and a tertiary structure. The phrase "tertiary structure" as used herein means a structure with one carbon having three alkyl groups and one hydrogen thereon. This method is advantageous because partially fluorinated alkanes having this tertiary structure have higher solvency toward polyols in addition to having zero ozone depletion potentials and being nonflammable.

Other objects and advantages of the invention will become apparent from the following description.

DETAILED DESCRIPTION OF THE PREFERRED EMBODIMENTS

Preferably, in the present method, the blowing agent comprising a partially fluorinated alkane having four or five carbon atoms and a tertiary structure is of the Formula:

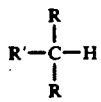

wherein each R is the same or different and is selected from the group consisting of CF$_3$, CHF$_2$, CH$_2$F, and CH$_3$CF$_2$—, and R' is selected from the group consisting of CF$_3$, CHF$_2$, CH$_2$F, CH$_3$, CF$_3$CF$_2$—, CF$_3$CHF—, CF$_3$CH$_2$—, CHF$_2$CF$_2$—, CHF$_2$CHF—, CHF$_2$CH$_2$—, CH$_2$FCF$_2$—, CH$_2$FCHF—, CH$_2$FCH$_2$—, CH$_3$CF$_2$—, and CH$_3$CHF— with the proviso that when one of the three alkyl groups has two carbons, each of the other two alkyl groups has one carbon.

Illustrative examples of the blowing agents follow. In the Formula above, when one R is CF$_3$, the other R is CHF$_2$, and R' is CH$_3$, the compound is 2-methyl-1,1,1,3,3-pentafluoropropane. When one R is CF$_3$, the other R is CH$_2$F, and R' is CH$_3$, the compound is 2-methyl-1,1,1,3-tetrafluoropropane. When one R is CF$_3$, the other R is CH$_2$F, and R' is CHF$_2$CHF—, the compound is 2-fluoromethyl-1,1,1,3,4,4-hexafluorobutane. When one R is CHF$_2$, the other R is CH$_2$F, and R' is CH$_3$, the compound is 2-methyl-1,1,3-trifluoropropane. When one R is CHF$_2$, the other R is CH$_2$F, and R' is CHF$_2$CH$_2$—, the compound is 2-fluoromethyl-1,1,4,4-tetrafluorobutane.

The novel compounds used in the present method may be prepared by adapting known methods for preparing hydrofluorocarbons. For example, 2-methyl-1,1,1,3,3-pentafluoropropane may be prepared by reacting commercially available 1,1,1-trifluoro-2-propanone with CF$_2$ carbene to form 2-trifluoromethyl-1,1-difluoro-1-propene which may then be hydrogenated to form 2-methyl-1,1,1,3,3-pentafluoropropane.

As another example, 2-methyl-1,1,1,3-tetrafluoropropane may be prepared by reacting commercially available methacrylic acid with hydrogen fluoride to form 2-methyl-3-fluoropropanoic acid which may then be fluorinated to form 2-methyl-1,1,1,3-tetrafluoropropane.

As another example, 2-fluoromethyl-1,1,1,3,4,4-hexafluorobutane may be prepared by fluorinating commercially available 3-chloropropionic acid to form 1,1,3-tetrafluoropropane which may then be reacted with CHF$_2$CF carbene to form 2-fluoromethyl-1,1,1,3,4,4-hexafluorobutane.

As another example, 2-methyl-1,1,3-trifluoropropane may be prepared by reacting commercially available fluoroacetone with a CF$_2$ carbene to form 2-fluoromethyl-1,1-difluoro-1-propene which may then be hydrogenated to form 2-methyl-1,1,3-trifluoropropane. As another example, 2-fluoromethyl-1,1,4,4-tetrafluorobutane may be prepared by oxidizing commercially available 3-fluoro-1,2-propanediol to form a product which may then be reacted with a CF$_2$ carbene to form 2-fluoromethyl-1,1,4,4-tetrafluoro-1,3-butadiene; the 2-fluoromethyl-1,1,4,4-tetrafluoro-1,3-butadiene may then be hydrogenated to form 2-fluoromethyl-1,1,4,4-tetrafluorobutane.

Preferably, each R in the Formula above is the same. When each R is CHF$_2$ and R' is CF$_3$, the compound is 2-difluoromethyl-1,1,1,3,3-pentafluoropropane. When each R is CHF$_2$ and R' is CH$_2$F, the compound is 2-fluoromethyl-1,1,3,3-tetrafluoropropane. When each R is CHF$_2$ and R' is CH$_3$, the compound is 2-methyl-1,1,3,3-tetrafluoropropane. When each R is CH$_2$F and R' is CHF$_2$, the compound is 2-fluoromethyl-1,1,3-trifluoropropane.

The 2-difluoromethyl-1,1,1,3,3-pentafluoropropane may be prepared by fluorinating commercially available 1,1,1,3,3-pentachloro-2-propanone to form 1,1,1,3,3-pentafluoro-2-propanone which may then be reacted with CF$_2$ carbene to form 2-difluoromethyl-1,1,3,3,3-tetrafluoro-1-propene. The 2-difluoromethyl-1,1,3,3,3-tetrafluoro-1-propene may then be hydrogenated to form 2-difluoromethyl-1,1,1,3,3-pentafluoropropane.

The 2-fluoromethyl-1,1,3,3-tetrafluoropropane may be prepared by fluorinating commercially available 1,1,3-trichloro-2-propanone to form 1,1,3-trifluoro-2-propanone which may then be reacted with CF$_2$ carbene to form 2-difluoromethyl-1,1,3-trifluoro-1-propene. The 2-difluoromethyl-1,1,3-trifluoro-1-propene may then be hydrogenated to form 2-fluoromethyl-1,1,3,3-tetrafluoropropane.

As another example, 2-methyl-1,1,3,3-tetrafluoropropane may be prepared by fluorinating commercially available 1,1-dichloro-2-propanone to form 1,1-difluoro-2-propanone which may then be reacted with CF$_2$ carbene to form 2-difluoromethyl-1,1-difluoro-1-propene. The 2-difluoromethyl-1,1-difluoro-1-propene may then be hydrogenated to form 2-methyl-1,1,3,3-tetrafluoropropane.

As another example, the 2-fluoromethyl-1,1,3-trifluoropropane may be prepared by oxidizing commercially available 1,3-difluoro-2-propanol to 1,3-difluoro-2-propanone which may then be reacted with a CF$_2$ carbene to form 2-fluoromethyl-1,1,3-trifluoro-1-propene. The 2-fluoromethyl-1,1,3-trifluoro-1-propene may then be hydrogenated to form 2-fluoromethyl-1,1,3-trifluoropropane.

More preferably in the Formula above, each R is CF$_3$ and R' is selected from the group consisting of CF$_3$, CHF$_2$, CH$_3$, CF$_3$CF$_2$—, CF$_3$CHF—, and CHF$_2$CH$_2$—. The names of the preceding preferred hydrofluorocarbons are 2-trifluoromethyl-1,1,1,3,3,3-hexafluoropropane; 2-difluoromethyl-1,1,1,3,3,3-hexafluoropropane; 2-methyl-1,1,1,3,3,3-hexafluoropropane; 2-trifluoromethyl-1,1,1,3,3,4,4,4-octafluorobutane; 2-trifluoromethyl-1,1,1,3,4,4,4-hexafluorobutane; and 2-trifluoromethyl-1,1,1,4,4-pentafluorobutane.

The 2-trifluoromethyl-1,1,1,3,3,3-hexafluoropropane of the present invention is known. It may be prepared by any known method including reacting commercially available hexafluoropropene with hydrogen fluoride to form 1,1,1,2,3,3,3-heptafluoropropane which may then be heated at 475°–700° C. in the presence of activated carbon as taught by commonly assigned U.S. Pat. No. 2,981,763 which is incorporated herein by reference; or reacting perfluoroisobutene with hydrogen fluoride in the presence of catalytic amounts of ammonium fluoride or triethylamine as taught by B. L. Dyatkin et al., "The Perfluoro-t-butyl Anion in the Synthesis of Organofluorine Compounds", *RUSSIAN CHEMICAL REVIEWS* 45(7), 607 (1976).

As another example, 2-difluoromethyl-1,1,1,3,3,3-hexafluoropropane may be prepared by treating commercially available hexafluoropropene with hydrogen fluoride as taught by commonly assigned U.K. Patent 902,590 to form 1,1,1,2,3,3,3-hexafluoropropane. The 1,1,1,2,3,3,3-hexafluoropropane may then be heated at 475°-700° C. in the presence of activated carbon as taught by commonly assigned U.S. Pat. No. 2,981,763 which is incorporated herein by reference to form 2-trifluoromethyl-1,1,1,3,3,3-hexafluoropropane or nonafluoroisobutane. The nonafluoroisobutane may then be treated with commercially available benzoyl chloride in the presence of commercially available triethylamine as taught by B. L. Dyatkin et al., "The Perfluoro-t-butyl Anion in the Synthesis of Organofluorine Compounds", *Russian Chemical Reviews* 45(7), 607 (1976) to form perfluoroisobutene. The perfluoroisobutene may then by hydrogenated to form 2-difluoromethyl-1,1,1,3,3,3-hexafluoropropane.

As another example, 2-methyl-1,1,1,3,3,3-hexafluoropropane may be prepared by reacting commercially available hexafluoropropene with elemental sulfur and commercially available potassium fluoride in commercially available dimethylformamide under substantially atmospheric pressure and at temperatures between 25°-100° C. as taught by commonly assigned U.S. Pat. No. 4,326,068 which is incorporated herein by reference to form hexafluorothioacetone dimer. The hexafluorothioacetone dimer may than be reacted with commercially available formaldehyde as taught by commonly assigned U.S. Pat. No. 4,367,349 which is incorporated herein by reference to form hexafluoroisobutylene. The hexafluoroisobutylene may then be hydrogenated to form 2-methyl-1,1,1,3,3,3-hexafluoropropane.

As another example, 2-trifluoromethyl-1,1,1,3,3,4,4,4-octafluorobutane may be prepared by reacting caesium fluoride and perfluoro-3-methylbut-1-ene in moist sulpholan as taught by Robert N. Haszeldine et al., "Fluoro-olefin Chemistry. Part 11. Some Reactions of Perfluoro-3-methylbut-1-ene under Ionic and Free-radical Conditions", *J. Chem. Soc.* 565 (1979).

As another example, 2-trifluoromethyl-1,1,1,3,4,4,4-hexafluorobutane may be prepared by reacting commercially available 1,1-difluoroethylene according to the procedure of George L. Fleming et al., "Addition of Free Radicals to Unsaturated Systems. Part XX. The Direction of Radical Addition of Heptafluoro-2-iodopropane to Vinyl Fluoride, Trifluoroethylene, and Hexafluoropropene", *J.C.S. Perkin I,* 574 (1973) to form a product which may then be fluorinated to form 2-trifluoromethyl-1,1,1,2,3,4,4,4-octafluorobutane. The 2-trifluoromethyl-1,1,1,2,3,4,4,4-octafluorobutane may then be dehydrohalogenated and then hydrogenated to form 2-trifluoromethyl-1,1,1,3,4,4,4-hexafluorobutane.

As another example, 2-trifluoromethyl-1,1,1,4,4-pentafluorobutane may be prepared by reacting commercially available 1,1-difluoroethylene according to the procedure of George L. Fleming et al., supra, to form a product which may then be hydrogenated to form 2-trifluoromethyl-1,1,1,2,4,4-hexafluorobutane which may then be dehydrohalogenated and then hydrogenated to form 2-trifluoromethyl-1,1,1,4,4-pentafluorobutane.

The use of 2-trifluoromethyl-1,1,1,3,3,3-hexafluoropropane is advantageous in the present method because 2-trifluoromethyl-1,1,1,3,3,3-hexafluoropropane has a zero ozone depletion potential, is nonflammable, and has a reported boiling point of 11°-12° C. according to commonly assigned U.S. Pat. No. 2,981,763. As such, 2-trifluoromethyl-1,1,1,3,3,3-hexafluoropropane may be used as a replacement for CFC-11.

The use of 2-methyl-1,1,1,3,3,3-hexafluoropropane is advantageous in the present method because 2-methyl-1,1,1,3,3,3-hexafluoropropane has a zero ozone depletion potential, is nonflammable, and has a boiling point which is calculated to be about 30° C. As such, 2-methyl-1,1,1,3,3,3-hexafluoropropane may be used as a replacement for CFC-11.

Other methods for preparing the partially fluorinated alkanes are disclosed in commonly assigned U.S. Pat. No. 5,059,728 which is incorporated herein by reference.

The partially fluorinated alkane having a tertiary structure may be used as an auxiliary or primary blowing agent for the preparation of polyurethane foams. Polyurethanes are polymers of polyols and isocyanates. A wide variety of polyols may be employed as disclosed in the prior art, such as polyether polyols and polyester polyols. Illustrative suitable polyether polyols are polyoxypropylene diols having a molecular weight of between about 1,500 and 2,500, glycerol based polyoxypropylene triols having a molecular weight of between about 1,000 and 3,000, trimethylol-propane-based triols having a hydroxyl number of about 390, sorbitol-based hexol having a hydroxyl number of about 490, and sucrose-based octols having a hydroxyl number of about 410. Illustrative suitable polyester polyols are the reaction products of polyfunctional organic carboxylic acids such as succinic acid, adipic acid, phthalic acid and terephthalic acid with monomeric polyhydric alcohols such as glycerol, ethylene glycol, trimethylol propane, and the like.

A wide variety of isocyanates may be employed as disclosed in the prior art. Illustrative suitable isocyanates are the aliphatic isocyanates such as hexamethylene diisocyanate, aromatic isocyanates such as toluene diisocyanate (TDI), preferably the isomeric mixture containing about 80 weight percent of the 2,4 isomer and 20 weight percent of the 2,6 isomer, crude TDI, crude diphenylmethane diisocyanate and polymethylpolyphenyl isocyanate.

The amount of partially fluorinated alkane having a tertiary structure to be employed as the blowing agent will depend on whether it is to be used as a primary or auxiliary blowing agent and the nature of the foams desired, i.e, whether flexible or rigid foam is desired.

The amount of partially fluorinated alkane having a tertiary structure employed as the blowing agent can be readily determined for each foaming system by persons of ordinary skill in the art. Generally, about 1 to about 15 weight percent based on the polyurethane forming reaction mixture of the blowing agent is employed and preferably, between about 5 to about 10 weight percent.

As is well known in the art, the urethane-forming reaction requires a catalyst. Any of the well known urethane-forming catalysts may be employed. Illustrative organic catalysts are the amino compounds such as triethylenediamine N,N,N',N'-tetramethylethylenediamine, dimethylethanolamine, triethylamine and N-ethyl-morpholine. Inorganic compounds such as the non-basic heavy metal compounds as illustrated by dibutyl tin dilaurate, stannous octoate and manganese acetyl acetonate may also be used as catalysts. In general, the amount of catalyst present in the foam forming mixture ranges from about 0.05 to about 2 parts by weight per 100 parts by weight of the polyol component.

As is well recognized in the art, a variety of other additives may be incorporated in the foam-forming mixtures including stabilizers, such as silicone oils; cross-linking agents such as 1,4-butanediol, glycerol, triethanolamine methylenedianiline; plasticizers, such as tricresyl phosphate and dioctyl phthalate; antioxidants; flame retardants; coloring material; fillers; and antiscorch agents.

Polyurethane foams are prepared according to the invention by reacting and foaming a mixture of ingredients which will react to form the foams in the presence of the blowing agent, a partially fluorinated alkane having a tertiary structure, according to the invention. In practice, the foam forming ingredients are blended, allowed to foam, and are then cured to a finished product. The foaming and curing reactions, and conditions therefor are well-known in the art and do not form a part of this invention. Such are more fully described in the prior art relating to the manufacture of polyurethane foams. Thus, for example, the polyether may first be converted to a polyether-polyisocyanate prepolymer by reaction in one or more stages with an excess amount of isocyanate at temperatures from about 75°–125° C. or by reacting the polyol and the isocyanate together at room temperature in the presence of a catalyst for the reaction such as N-methylmorpholine. The prepolymer would then be charged to the foam-forming mixture as the foam producing ingredient with or without the addition of additional isocyanate and foamed in the presence of the blowing agent, optionally with additional polyol cross-linking agents and other conventional optional additives. Heat may be applied to cure the foam. If a prepolymer is not employed, the polyether, isocyanate, partially fluorinated alkane having a tertiary structure blowing agent, and other optional additives may be reacted simultaneously to produce the foam in a single stage.

A premix of the polyol and partially fluorinated alkane having a tertiary structure blowing agent may also be used. This premix has enhanced stability due to the partially fluorinated alkane having a tertiary structure.

The present invention is more fully illustrated by the following non-limiting Examples.

EXAMPLES 1–102

A rigid polyurethane foam is prepared by using each of the blowing agents of the Formula above having the R and R' groups as indicated in Table I below.

TABLE I

| Example | R | R' |
|---|---|---|
| 1 | $CF_3$, $CHF_2$ | $CF_3$ |
| 2 | $CF_3$, $CHF_2$ | $CHF_2$ |
| 3 | $CF_3$, $CHF_2$ | $CH_2F$ |
| 4 | $CF_3$, $CHF_2$ | $CH_3$ |
| 5 | $CF_3$, $CHF_2$ | $CF_3CF_2$ |
| 6 | $CF_3$, $CHF_2$ | $CF_3CHF$ |
| 7 | $CF_3$, $CHF_2$ | $CF_3CH_2$ |
| 8 | $CF_3$, $CHF_2$ | $CHF_2CF_2$ |
| 9 | $CF_3$, $CHF_2$ | $CHF_2CHF$ |
| 10 | $CF_3$, $CHF_2$ | $CHF_2CH_2$ |
| 11 | $CF_3$, $CHF_2$ | $CH_2FCF_2$ |
| 12 | $CF_3$, $CHF_2$ | $CH_2FCHF$ |
| 13 | $CF_3$, $CHF_2$ | $CH_2FCH_2$ |
| 14 | $CF_3$, $CHF_2$ | $CH_3CF_2$ |
| 15 | $CF_3$, $CHF_2$ | $CH_3CHF$ |
| 16 | $CF_3$, $CH_2F$ | $CF_3$ |
| 17 | $CF_3$, $CH_2F$ | $CHF_2$ |
| 18 | $CF_3$, $CH_2F$ | $CH_2F$ |
| 19 | $CF_3$, $CH_2F$ | $CH_3$ |
| 20 | $CF_3$, $CH_2F$ | $CF_3CF_2$ |
| 21 | $CF_3$, $CH_2F$ | $CF_3CHF$ |
| 22 | $CF_3$, $CH_2F$ | $CF_3CH_2$ |
| 23 | $CF_3$, $CH_2F$ | $CHF_2CF_2$ |
| 24 | $CF_3$, $CH_2F$ | $CHF_2CHF$ |
| 25 | $CF_3$, $CH_2F$ | $CHF_2CH_2$ |
| 26 | $CF_3$, $CH_2F$ | $CH_2FCF_2$ |
| 27 | $CF_3$, $CH_2F$ | $CH_2FCHF$ |
| 28 | $CF_3$, $CH_2F$ | $CH_2FCH_2$ |
| 29 | $CF_3$, $CH_2F$ | $CH_3CF_2$ |
| 30 | $CF_3$, $CH_2F$ | $CH_3CHF$ |
| 31 | $CF_3$, $CH_3CF_2$ | $CF_3$ |
| 32 | $CF_3$, $CH_3CF_2$ | $CHF_2$ |
| 33 | $CF_3$, $CH_3CF_2$ | $CH_2F$ |
| 34 | $CF_3$, $CH_3CF_2$ | $CH_3$ |
| 35 | $CHF_2$, $CH_2F$ | $CF_3$ |
| 36 | $CHF_2$, $CH_2F$ | $CHF_2$ |
| 37 | $CHF_2$, $CH_2F$ | $CH_2F$ |
| 38 | $CHF_2$, $CH_2F$ | $CH_3$ |
| 39 | $CHF_2$, $CH_2F$ | $CF_3CF_2$ |
| 40 | $CHF_2$, $CH_2F$ | $CF_3CHF$ |
| 41 | $CHF_2$, $CH_2F$ | $CF_3CH_2$ |
| 42 | $CHF_2$, $CH_2F$ | $CHF_2CF_2$ |
| 43 | $CHF_2$, $CH_2F$ | $CHF_2CHF$ |
| 44 | $CHF_2$, $CH_2F$ | $CHF_2CH_2$ |
| 45 | $CHF_2$, $CH_2F$ | $CH_2FCF_2$ |
| 46 | $CHF_2$, $CH_2F$ | $CH_2FCHF$ |
| 47 | $CHF_2$, $CH_2F$ | $CH_2FCH_2$ |
| 48 | $CHF_2$, $CH_2F$ | $CH_3CF_2$ |
| 49 | $CHF_2$, $CH_2F$ | $CH_3CHF$ |
| 50 | $CHF_2$, $CH_3CF_2$ | $CF_3$ |
| 51 | $CHF_2$, $CH_3CF_2$ | $CHF_2$ |
| 52 | $CHF_2$, $CH_3CF_2$ | $CH_2F$ |
| 53 | $CHF_2$, $CH_3CF_2$ | $CH_3$ |
| 54 | $CH_2F$, $CH_3CF_2$ | $CF_3$ |
| 55 | $CH_2F$, $CH_3CF_2$ | $CHF_2$ |
| 56 | $CH_2F$, $CH_3CF_2$ | $CH_2F$ |
| 57 | $CH_2F$, $CH_3CF_2$ | $CH_3$ |
| 58 | $CF_3$, $CF_3$ | $CF_3$ |
| 59 | $CF_3$, $CF_3$ | $CHF_2$ |
| 60 | $CF_3$, $CF_3$ | $CH_2F$ |
| 61 | $CF_3$, $CF_3$ | $CH_3$ |
| 62 | $CF_3$, $CF_3$ | $CF_3CF_2$ |
| 63 | $CF_3$, $CF_3$ | $CF_3CHF$ |
| 64 | $CF_3$, $CF_3$ | $CF_3CH_2$ |
| 65 | $CF_3$, $CF_3$ | $CHF_2CF_2$ |
| 66 | $CF_3$, $CF_3$ | $CHF_2CHF$ |
| 67 | $CF_3$, $CF_3$ | $CHF_2CH_2$ |
| 68 | $CF_3$, $CF_3$ | $CH_2FCF_2$ |
| 69 | $CF_3$, $CF_3$ | $CH_2FCHF$ |
| 70 | $CF_3$, $CF_3$ | $CH_2FCH_2$ |
| 71 | $CF_3$, $CF_3$ | $CH_3CF_2$ |
| 72 | $CF_3$, $CF_3$ | $CH_3CHF$ |
| 73 | $CHF_2$, $CHF_2$ | $CF_3$ |
| 74 | $CHF_2$, $CHF_2$ | $CHF_2$ |
| 75 | $CHF_2$, $CHF_2$ | $CH_2F$ |
| 76 | $CHF_2$, $CHF_2$ | $CH_3$ |
| 77 | $CHF_2$, $CHF_2$ | $CF_3CF_2$ |
| 78 | $CHF_2$, $CHF_2$ | $CF_3CHF$ |
| 79 | $CHF_2$, $CHF_2$ | $CF_3CH_2$ |
| 80 | $CHF_2$, $CHF_2$ | $CHF_2CF_2$ |
| 81 | $CHF_2$, $CHF_2$ | $CHF_2CHF$ |
| 82 | $CHF_2$, $CHF_2$ | $CHF_2CH_2$ |
| 83 | $CHF_2$, $CHF_2$ | $CH_2FCF_2$ |
| 84 | $CHF_2$, $CHF_2$ | $CH_2FCHF$ |
| 85 | $CHF_2$, $CHF_2$ | $CH_2FCH_2$ |
| 86 | $CHF_2$, $CHF_2$ | $CH_3CF_2$ |
| 87 | $CHF_2$, $CHF_2$ | $CH_3CHF$ |
| 88 | $CH_2F$, $CH_2F$ | $CF_3$ |
| 89 | $CH_2F$, $CH_2F$ | $CHF_2$ |
| 90 | $CH_2F$, $CH_2F$ | $CH_2F$ |
| 91 | $CH_2F$, $CH_2F$ | $CH_3$ |
| 92 | $CH_2F$, $CH_2F$ | $CF_3CF_2$ |
| 93 | $CH_2F$, $CH_2F$ | $CF_3CHF$ |
| 94 | $CH_2F$, $CH_2F$ | $CF_3CH_2$ |
| 95 | $CH_2F$, $CH_2F$ | $CHF_2CF_2$ |
| 96 | $CH_2F$, $CH_2F$ | $CHF_2CHF$ |
| 97 | $CH_2F$, $CH_2F$ | $CHF_2CH_2$ |
| 98 | $CH_2F$, $CH_2F$ | $CH_2FCF_2$ |
| 99 | $CH_2F$, $CH_2F$ | $CH_2FCHF$ |
| 100 | $CH_2F$, $CH_2F$ | $CH_2FCH_2$ |
| 101 | $CH_2F$, $CH_2F$ | $CH_3CF_2$ |

TABLE I-continued

| Example | R | R' |
|---------|---|-----|
| 102 | $CH_2F$, $CH_2F$ | $CH_3CHF$ |

Free-rise rigid polyurethane foam is prepared from the formulation specified in Table II below using a Martin Sweets Co. Modern Module III urethane foam machine at a delivery rate of 15 lbs./min. This polyurethane formulation is one example of a pour-in-place rigid polyurethane formulation which might be used as an appliance insulation.

TABLE II

| Rigid Polyurethane Formulation | |
|---|---|
| Component | Parts by Weight |
| Pluracol 1114[1] (420-OH#) (trademark) | 100. |
| Silicone L-5340[2] | 1.5 |
| Thancat TD-33[3] (trademark) | 0.5 |
| Thancat DME[4] (trademark) | 0.2 |
| Catalyst T-12[5] | 0.1 |
| Blowing Agent | 33.24 |
| Lupranate M20S[6] (1.29 Index) (trademark) | 129. |

[1]BASF Wyandotte Corp. - polyether polyol
[2]Union Carbide Corp. - silicone surfactant
[3]Texaco Inc. - 33% triethylene diamine in propylene glycol
[4]Texaco Inc. - N,N-dimethylethanolamine
[5]Metal & Thermit Co. - dibutyl dilaurate
[6]BASF Wyandotte Corp. - polymethylene polyphenylisocyanate

EXAMPLES 103-204

A flexible polyurethane foam is prepared by using each of the blowing agents of the Formula above having the R and R' groups as indicated in Table I above.

Free-rise flexible polyurethane foam is prepared from the formulation specified in Table III below using a Martin Sweets Co. Modern Module III urethane foam machine at a delivery rate of 15 lbs./min. This polyurethane formulation is one example of a formulation which might be used in furniture.

TABLE III

| Flexible Polyurethane Formulation | |
|---|---|
| Component | Parts by Weight |
| Pluracol 924[1] (trademark) | 100. |
| Water | 3.5 |
| Silicone DC-190[2] | 1.5 |
| Thancat TD-33[3] (trademark) | 0.3 |
| Dabco T-9[4] | 0.1 |
| Blowing Agent | 5.0 |
| Lupranate T-80[5] (1.05 Index) (trademark) | 43.7 |

[1]BASF Wyandotte Corp. - polyether polyol
[2]Union Carbide Corp. - silicone surfactant
[3]Texaco Inc. - 33% triethylene diamine in propylene glycol
[4]Air Products - stannous-2-ethylhexoate
[5]BASF Wyandotte Corp. - polymethylene polyphenylisocyanate Having described the invention in detail and by reference to preferred embodiments thereof, it will be apparent that modifications and variations are possible without departing from the scope of the invention defined in the appended claims.

What is claimed is:

1. A method for preparing polyurethane and polyisocyanurate foams which comprises reacting and foaming a mixture of ingredients which will react to form the polyurethane and polyisocyanurate foams in the presence of a blowing agent comprising a partially fluorinated alkane having four or five carbon atoms and a tertiary structure wherein said partially fluorinate alkane has the formula

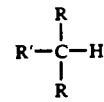

wherein each R is the same or different and is selected from the group consisting of $CF_3$, $CHF_2$, $CH_2F$, and $CH_3CF_2$—, and R' is selected from the group consisting of $CF_3$, $CHF_2$, $CH_2F$, $CH_3$, $CF_3CF_2$—, $CF_3CHF$—, $CF_3CH_2$—, $CHF_2CF_2$—, $CHF_2CHF$—, $CHF_2CH_2$—, $CH_2FCF_2$—, $CH_2FCHF$—, $CH_2FCH_2$—, $CH_3CF_2$—, and $CH_3CHF$— with the proviso that when one of the three alkyl groups has two carbons, each of the other two alkyl groups has one carbon.

2. The method of claim 1 wherein each R of said partially fluorinated alkane is the same.

3. The method of claim 2 wherein each R of said partially fluorinated alkane is $CF_3$.

4. The method of claim 1 wherein said partially fluorinated alkane is selected from the group consisting of 2-difluoromethyl-1,1,1,3,3,3,-hexafluoropropane; 2-methyl-1,1,1,3,3,3-hexafluoropropane; 2-trifluoromethyl-1,1,1,3,4,4,4-hexafluorobutane; and 2-trifluoromethyl-1,1,1,4,4,4-pentafluorobutane.

5. The method of claim 1 wherein said blowing agent is 2-methyl-1,1,1,3,3,3-hexafluoropropane.

6. A premix of a polyol and a blowing agent comprising a partially fluorinated alkane having four or five carbon atoms and a tertiary structure wherein said partially fluorinated alkane has the formula

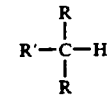

wherein each R is the same or different and is selected from the group consisting of $CF_3$, $CHF_2$, $CH_2F$, and $CH_3CF_2$—, and R' is selected from the group consisting of $CF_3$, $CHF_2$, $CH_2F$, $CH_3$, $CF_3CF_2$—, $CF_3CHF$—, $CF_3CH_2$—, $CHF_2CF_2$, $CHF_2CHF$—, $CHF_2CH_2$—, $CH_2FCF_2$—, $CH_2FCHF$—, $CH_2FCH_2$—, $CH_3CF_2$—, and $CH_3CHF$— with the proviso that when one of the three alkyl groups has two carbons, each of the other two alkyl groups has one carbon and with the proviso that when each R is $CF_3$, R' is not $CF_3CF_2$— or $CF_3$.

7. The premix of claim 6 wherein each R of said partially fluorinated alkane is the same.

8. The premix of claim 7 wherein each R of said partially fluorinated alkane is $CF_3$.

9. The premix of claim 6 wherein said partially fluorinated alkane is selected from the group consisting of 2-difluoromethyl-1,1,1,3,3,3,-hexafluoropropane; 2-methyl-1,1,1,3,3,3-hexafluoropropane; 2-trifluoromethyl-1,1,1,3,4,4,4-hexafluorobutane; and 2-trifluoromethyl-1,1,1,4,4,4-pentafluorobutane.

10. The premix of claim 6 wherein said blowing agent is 2-methyl-1,1,1,3,3,3-hexafluoropropane.

* * * * *